US012576377B2

(12) United States Patent
Hilden

(10) Patent No.: US 12,576,377 B2
(45) Date of Patent: Mar. 17, 2026

(54) VORTEX DISRUPTOR FOR A LIQUID CIRCULATOR

(71) Applicant: Kasco Marine, Inc., Prescott, WI (US)

(72) Inventor: Travis Hilden, Prescott, WI (US)

(73) Assignee: Kasco Marine, Inc., Prescott, WI (US)

( * ) Notice: Subject to any disclaimer, the term of this patent is extended or adjusted under 35 U.S.C. 154(b) by 475 days.

(21) Appl. No.: 18/183,459

(22) Filed: Mar. 14, 2023

(65) Prior Publication Data

US 2023/0294055 A1 Sep. 21, 2023

Related U.S. Application Data

(60) Provisional application No. 63/321,394, filed on Mar. 18, 2022.

(51) Int. Cl.

| | |
|---|---|
| ***B01F 35/00*** | (2022.01) |
| ***B01F 23/45*** | (2022.01) |
| ***B01F 25/54*** | (2022.01) |
| *B01F 101/00* | (2022.01) |

(52) U.S. Cl.

CPC .............. *B01F 35/55* (2022.01); *B01F 23/45* (2022.01); *B01F 25/54* (2022.01); *B01F 2101/305* (2022.01)

(58) Field of Classification Search

CPC ............................... B01F 33/503; B01F 35/55

See application file for complete search history.

(56) References Cited

U.S. PATENT DOCUMENTS

| | | | | |
|---|---|---|---|---|
| 4,732,682 | A * | 3/1988 | Rymal | C02F 3/207 210/219 |
| 6,824,124 | B2 * | 11/2004 | Henley | C02F 3/207 261/87 |
| 8,298,411 | B2 * | 10/2012 | Roberts | C02F 3/206 210/170.11 |
| 10,392,763 | B2 | 8/2019 | Stone | |
| 2014/0061957 | A1 * | 3/2014 | Geremia | B01F 23/23 261/24 |
| 2021/0340043 | A1 | 11/2021 | Dombrock et al. | |

* cited by examiner

*Primary Examiner* — Elizabeth Insler

(74) *Attorney, Agent, or Firm* — Merchant & Gould P.C.

(57) ABSTRACT

A liquid circulator for creating liquid circulation in a body of liquid includes a vortex disrupter or blocker that disrupts a vortex created by the circulation assembly of the liquid circulator to minimize or eliminate the slurping/slapping sound. The liquid circulator and vortex disrupter described herein may be used in shallow water with the liquid circulator mounted to a structure, such as a dock or pier. The vortex disruptor permits the circulation assembly to be operated closer to the water surface, while minimizing or eliminating the slurping/slapping sound, and with the circulation assembly further away from the bottom to avoid moving too much debris or possibly causing dredging/trenching on the bottom.

7 Claims, 6 Drawing Sheets

VORTEX DISRUPTOR FOR A LIQUID CIRCULATOR

FIELD

This technical disclosure relates to liquid circulators for circulating liquids such as water, chemical mixtures, or suspensions.

BACKGROUND

It is known to use a water circulator to create water circulation in a body of water to improve water quality and remove debris and sediment buildup. The water circulator may be fixed in position or it may oscillate to expand the area impacted by the circulating water. An example of a water circulator 10 with a circulation assembly 12 submerged in the water is depicted in FIG. 1. In some circumstances, for example when the circulation assembly 12 is positioned too close to the surface of the water, the operation of the circulation assembly 12 can create a vortex of air 14 being pulled down toward the circulation assembly 12. This not only reduces flow/effectiveness of the circulation assembly 12, but also creates a loud, slurping/slapping sound. Conversely, if the circulation assembly is too close to the bottom of the water, the circulation assembly 12 can move too much debris or possibly cause dredging/trenching on the bottom, which is not desirable.

SUMMARY

A liquid circulator for creating liquid circulation in a body of liquid is described that includes a vortex disrupter or blocker that disrupts a vortex created by the circulation assembly of the liquid circulator to minimize or eliminate the slurping/slapping sound. One non-limiting example use of the liquid circulator and vortex disrupter described herein is in shallow water with the liquid circulator mounted to a structure, such as a dock or pier. The vortex disruptor permits the circulation assembly to be operated closer to the water surface, while minimizing or eliminating the slurping/slapping sound, and with the circulation assembly further away from the bottom to avoid moving too much debris or possibly causing dredging/trenching on the bottom.

The vortex disruptor can take any form that is suitable for disrupting the vortex. The vortex disruptor can be mounted to the liquid circulator, and in one embodiment the vortex disruptor is attached to the liquid circulator at any location other than a propeller guard of the liquid circulation assembly of the liquid circulator.

In one embodiment described herein, a liquid circulator for creating liquid circulation in a body of liquid is described. The liquid circulator can include a liquid circulation assembly mounted to a support structure. The liquid circulation assembly includes a rotatable liquid propeller, an electric drive motor connected to the rotatable liquid propeller to rotate the rotatable liquid propeller, and a propeller guard at least partially surrounding the rotatable liquid propeller. In addition, a buoy is attached to the liquid circulator. The buoy is one form of vortex disruptor described herein that is configured to disrupt the vortex created by the propeller. However, the vortex can have other constructions as well.

In another embodiment described herein, a liquid circulator for creating liquid circulation in a body of liquid is described. The liquid circulator can include a shaft that is mountable to a support structure, and a liquid circulation assembly that is mounted at a lower end of the shaft. The liquid circulation assembly includes a rotatable liquid propeller, an electric drive motor connected to the rotatable liquid propeller to rotate the rotatable liquid propeller, and a propeller guard at least partially surrounding the rotatable liquid propeller. A vortex disruptor is attached to the liquid circulator at a location other than the propeller guard so as to be positioned at a location suitable to disrupt a vortex created by the rotatable liquid propeller.

DRAWINGS

DETAILED DESCRIPTION

Figure 1:
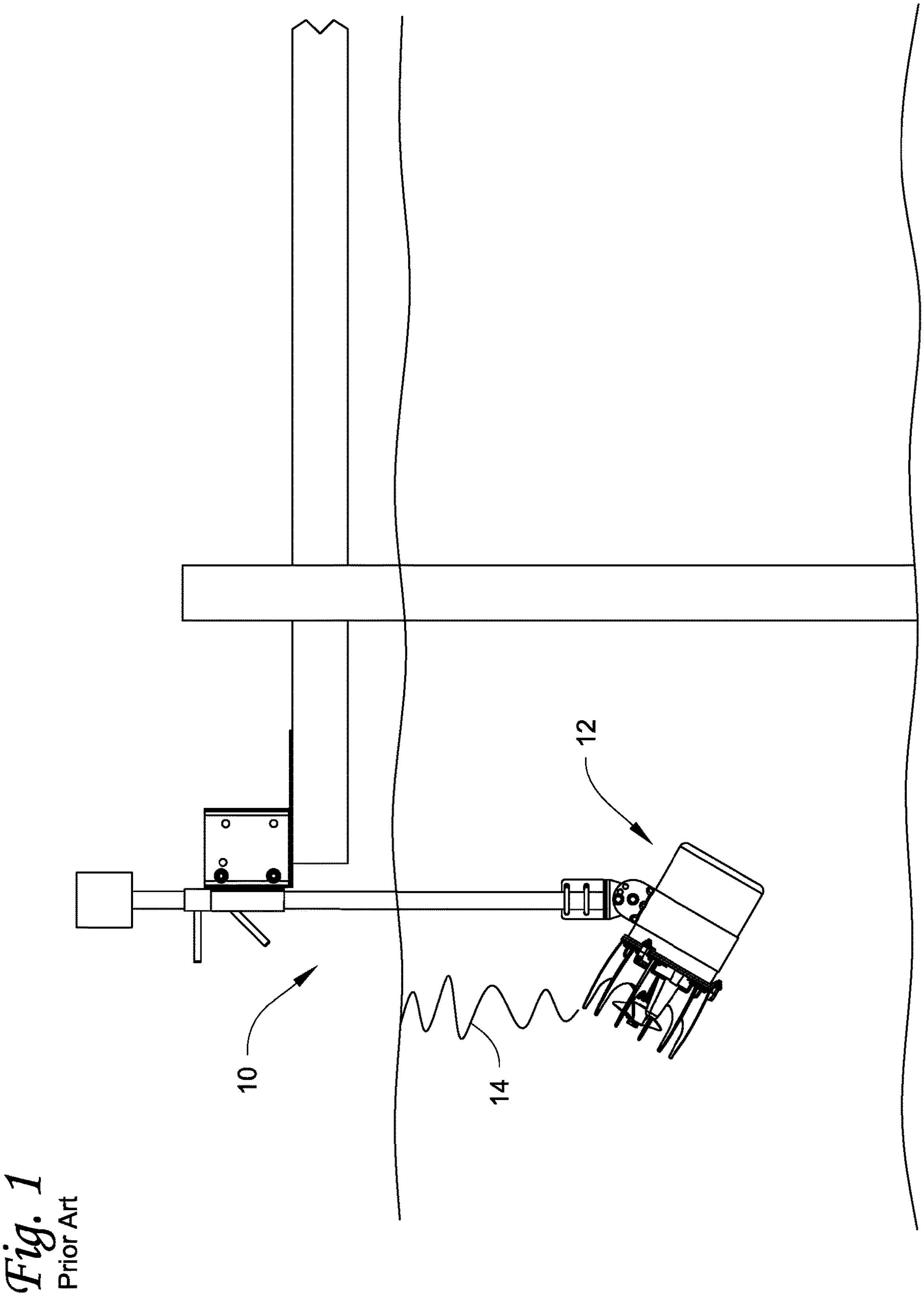
Fig. 1 Prior Art
FIG. 1 depicts an example of a liquid circulator creating a vortex at the water surface.
Figure 2:
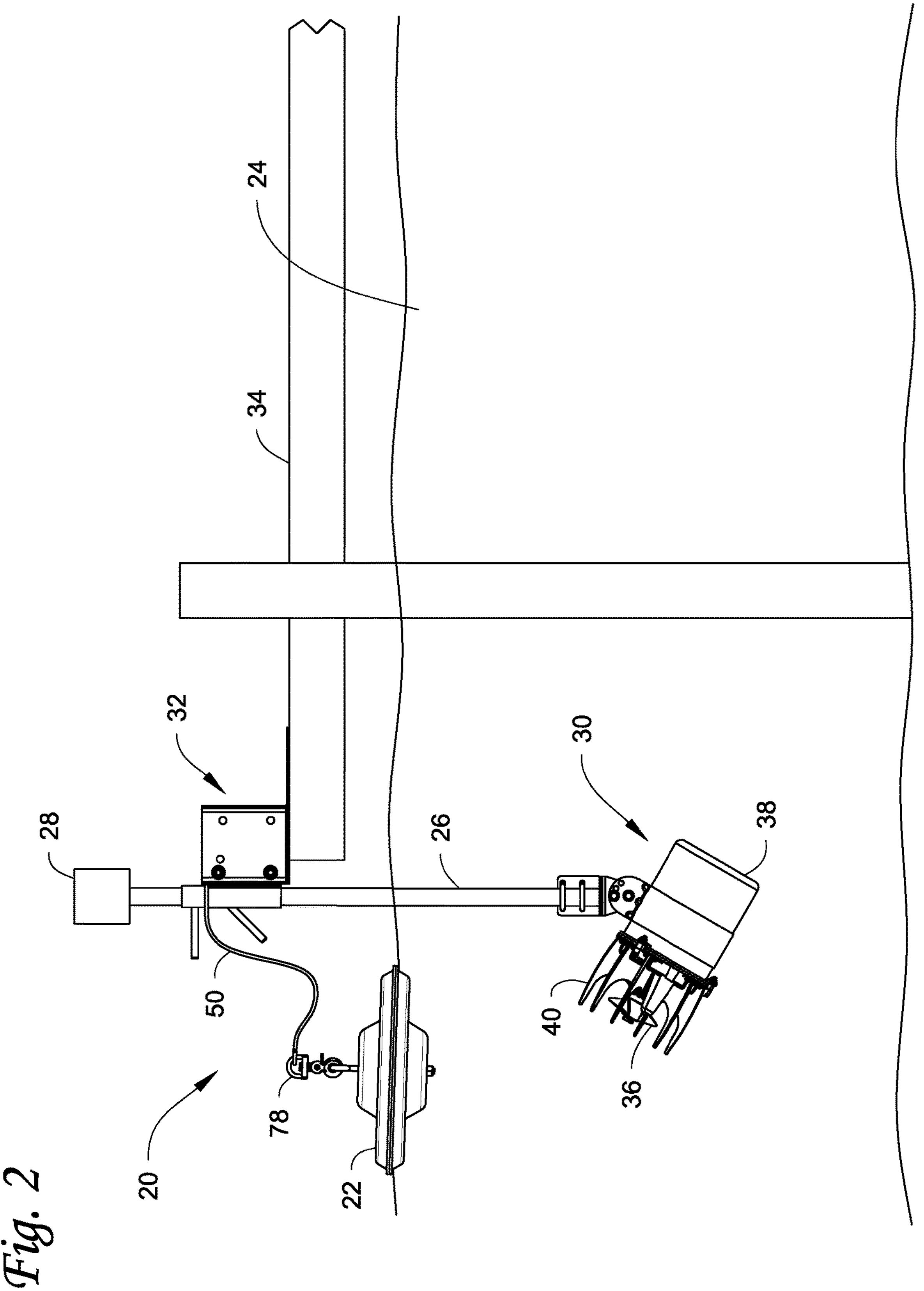
FIG. 2 depicts an example of a liquid circulator having a vortex disruptor in the form of a buoy.
Figure 3:
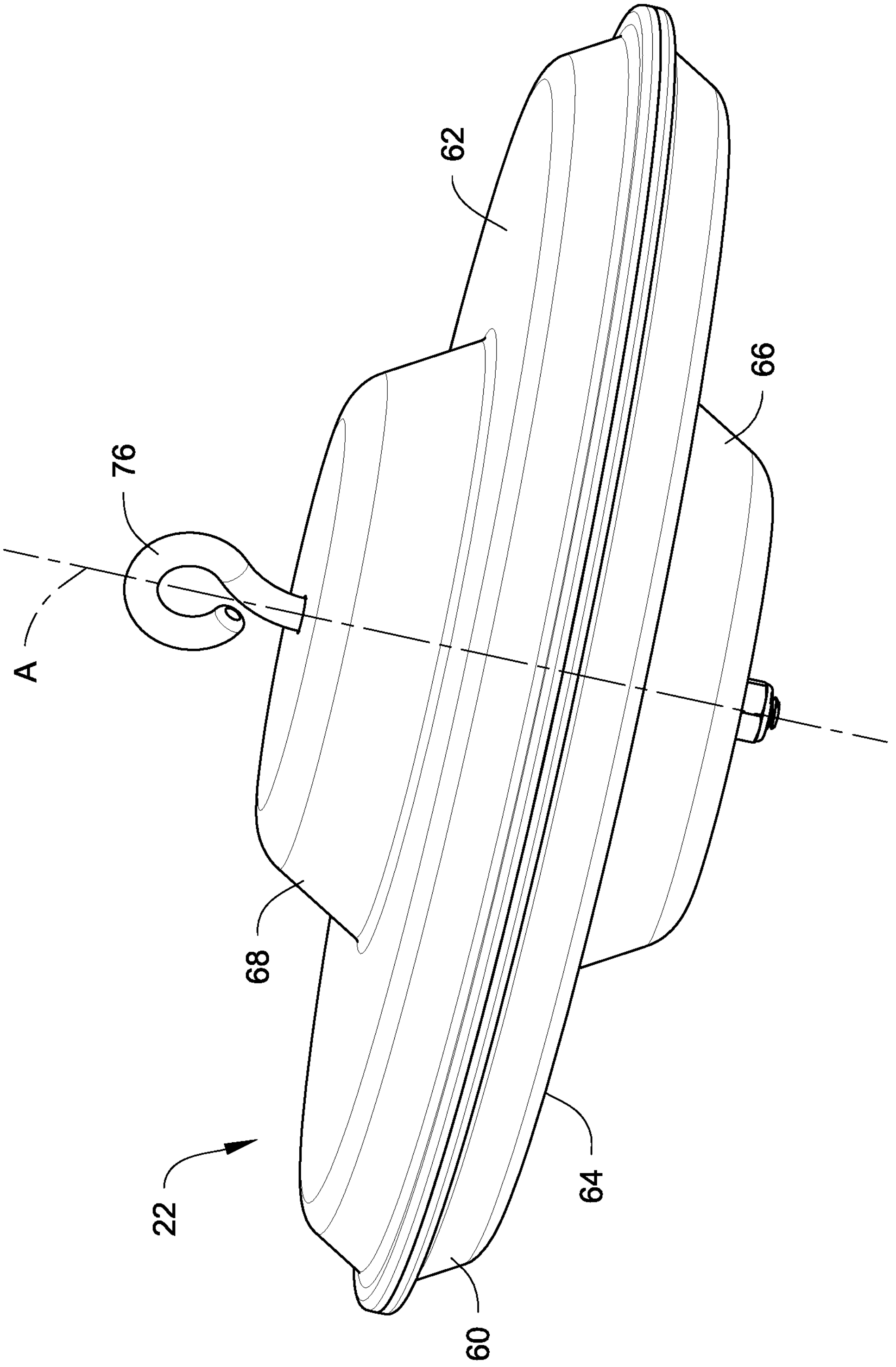
FIG. 3 is a detailed perspective view of the vortex disruptor buoy.
Figure 4:
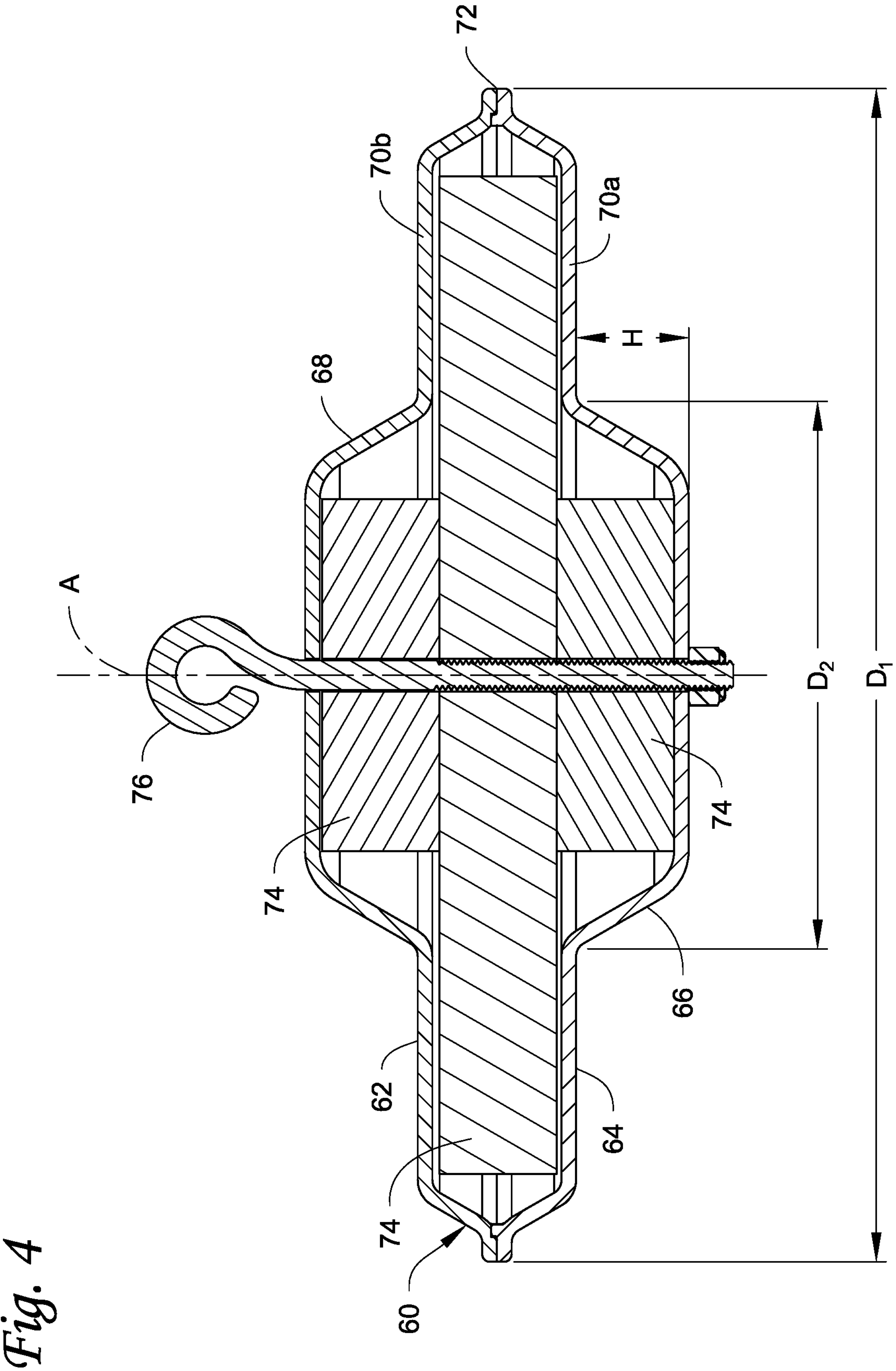
FIG. 4 is a cross-sectional side view of the vortex disruptor buoy.

Referring to FIGS. 2-4, a liquid circulator 20 (also referred to as a water circulator) is depicted that includes a vortex disruptor in the form of a buoy 22. The liquid circulator 20 is configured to create a continuous circulation within a body of liquid 24 (shown in FIG. 2) when the liquid circulator 20 is operating. For example, the body of liquid 24 can be a lake, pond, river, canal and the like, and the circulator 20 of FIG. 2 can be used to circulate water in a localized area in the body of water. The localized area may be at or near a marina, around or adjacent to a dock, near a waterfront or other location, and other locations in a body of water. However, the circulator 20 can be used to create circulation in other bodies of liquid other than water or mixtures of water and other liquid(s) including, but not limited to, treatment tanks for water and/or chemicals for mixing the contents to keep solids and chemicals in suspension and evenly distributed.

With continued reference to FIG. 2, the circulator 20 includes an optional support shaft 26, an optional head unit 28, and a liquid circulation assembly 30. In operation of the circulator 20, the circulator 20 is mounted in position so that the circulation assembly 30 is disposed within the liquid for creating a circulation of the liquid.

The support shaft 26, if used, has an upper end located out of the liquid and connected to the optional head unit 28 and a lower end disposed in the liquid and attached to the circulation assembly 30. In an embodiment, the support shaft 26 is stationary or fixed during operation of the circulation assembly 30 whereby the support shaft 26 does not rotate during use. For example, the shaft 26 can be manually rotated relative to the mount bracket 32 by loosening the mount bracket 32, rotating the support shaft to change the orientation of the circulation assembly 30, and then tightening the mount bracket 32 to fix the position of the support shaft 26. In another embodiment, the support shaft 26 may oscillate during use in order to oscillate the circulation assembly 30. Mechanisms for mechanically oscillating a shaft of a liquid circulator to oscillate the circulation assembly are known in the art. The support shaft 26 may be circular in cross-section or have another cross-sectional shape such as square, rectangular or triangular. The support shaft 26 may also be hollow to allow passage of, for example, an electrical cord for providing electrical power to the circulation assembly 30. The support shaft 26 can be formed of material, such as metal or plastic, that is suitable for use in a liquid environment. The mount bracket 32 (or a dock mount when used as a water circulator in a body of water) is connected to the support shaft 26 for mounting the support shaft 26, and thus mounting the entire circulator 20, to a support structure 34 (visible in FIG. 2) such as a dock or pier when used as a water circulator in that environment. A suitable mount bracket that can be used is available from Kasco Marine, Inc. of Prescott, Wisconsin. The circulation assembly 30 can be supported in the water in other ways, including using the support structure described in U.S. Pat. No. 10,392,763 the entire contents of which are incorporated herein by reference in their entirety, or any of the universal mount kits available from Kasco Marine, Inc. of Prescott, Wisconsin.

The head unit 28, if used, is mounted to the upper end of the support shaft 26. The head unit 28 is configured to control operation of the circulator 20 including controlling operation of the circulation assembly 30. The head unit 28 can include a control panel through which control inputs can be entered for controlling operation of the circulator 20. Examples of control inputs that can be input via the control panel include, but are not limited to, on/off control of the motor of the circulation assembly 30, and speed control of the motor of the circulation assembly 30. Electrical power for the circulator 20 can be provided via a power cord plugging into a conventional electrical outlet. In another embodiment, the circulator 20 can be powered by one or more batteries and/or by one or more solar panels. In an embodiment, the head unit 28 may also control oscillation of the shaft 26.

With continued reference to FIG. 2, the circulation assembly 30 is mounted to the support shaft 26 at a lower end thereof. The circulation assembly 30 is configured to generate the liquid circulation and includes a rotatable propeller 36 and a drive motor 38 connected to the rotatable propeller 36 to rotate the rotatable propeller 36. The propeller 36 can have any configuration that generates a flow of liquid when rotated. The flow of liquid generated by the propeller 36 can be an axial flow of liquid that flows in a direction away from the drive motor 38. The drive motor 38 can be a one-way, electrically driven motor. Electrical power for powering the drive motor 38 can be provided by an electrical power cord that can be routed from the head unit 28 and through the support shaft 26. In one embodiment, a propeller guard 40 can be provided that at least partially surrounds, preferably completely surrounds, the propeller 36 to, for example, protect against contact with the propeller 36 and to prevent large debris from reaching the propeller 36. In an embodiment, the propeller guard 40 can have a construction as described in U.S. 2021/0340043 which is incorporated herein by reference in its entirety. Alternatively, the propeller guard 40 can have a cage-like structure similar to that shown in U.S. Pat. No. 10,392,763.

The vortex disruptor 22 is attached to the liquid circulator 20 at a location that is suitable to allow the vortex disruptor 22 to disrupt a vortex created by the liquid propeller 36. In the example in FIGS. 2-4, the vortex disruptor 22 is configured as a buoy (also referred to as a vortex disruptor buoy) that is tethered to the liquid circulator 20 via a tether 50 that prevents the buoy from floating away. In another embodiment, instead of being tethered to the liquid circulator 20, the buoy can be tethered to the support structure 34 or to the mount bracket 32 via the tether 50.

The buoy has a configuration that allows it to self-locate over the location where the vortex created by the propeller 36 is trying to form so that the buoy is automatically drawn into position over the location where the vortex is trying to form to disrupt the vortex and/or prevent formation of the vortex and preventing the slurping/slapping sound.

Referring to FIGS. 3-4, the vortex disruptor buoy 22 is illustrated in more detail. In general, the buoy maybe referred to as having a disk shape or a flying saucer shape. The buoy floats on the water surface. In another embodiment, the buoy may be neutrally buoyant so that it floats below the surface of the water. The buoy is generally circular and includes a disk portion 60 (also referred to as a central portion) with an upper side 62, a lower side 64 and a center axis A. A tapered element 66, for example in the form of a conical frustum, extends downwardly from the lower side 64 coaxial with the center axis A. The tapered element 66 causes the buoy to self-locate over the location where vortex is trying to form. A similar tapered element 68 in the form of a conical frustum may also extend upwardly from the upper side 62 coaxial with the center axis A. The tapered element 66 and the tapered element 68 can have a similar or the same diameter and height H. Referring to FIG. 4, the disk portion 60 has a first diameter $D_1$, and the tapered portion 66 has a second, maximum diameter $D_2$, and first diameter $D_1$ is greater than the second, maximum diameter $D_2$.

The disk portion 60, the tapered element 66 and the optional tapered element 68 form a buoy body of the buoy. As seen in FIG. 4, the buoy is formed by an exterior shell comprising two shell-halves including a lower shell half 70*a* and an upper shell half 70*b* that are connected to one another along a perimeter edge 72. The shell halves 70*a*, 70*b* can be formed of material suitable for use in a water environment, such as rubber. When connected to one another, the shell halves 70*a*, 70*b* define an interior space and one or more float elements 74, such as one or more foam blocks, are disposed in the interior space to provide the buoy with buoyancy. In another embodiment, the buoy may be an inflatable device that is inflated with air or other gas to provide the buoy with buoyancy.

A connector 76 is mounted on the buoy body that is attached to an end of the tether 50 via a swivel 78 (FIG. 2). The swivel 78 permits the tether 50 and the buoy body to rotate relative to each other so that the tether 50 does not wind around the connector 76. The swivel 78 and the connector 76 can have any form that allows the tether 50 to connect to the buoy. In the illustrated example, the connector 76 is depicted as an eye bolt that extends through the buoy. However, the connector 76 can have other constructions as well.

Figure 5:
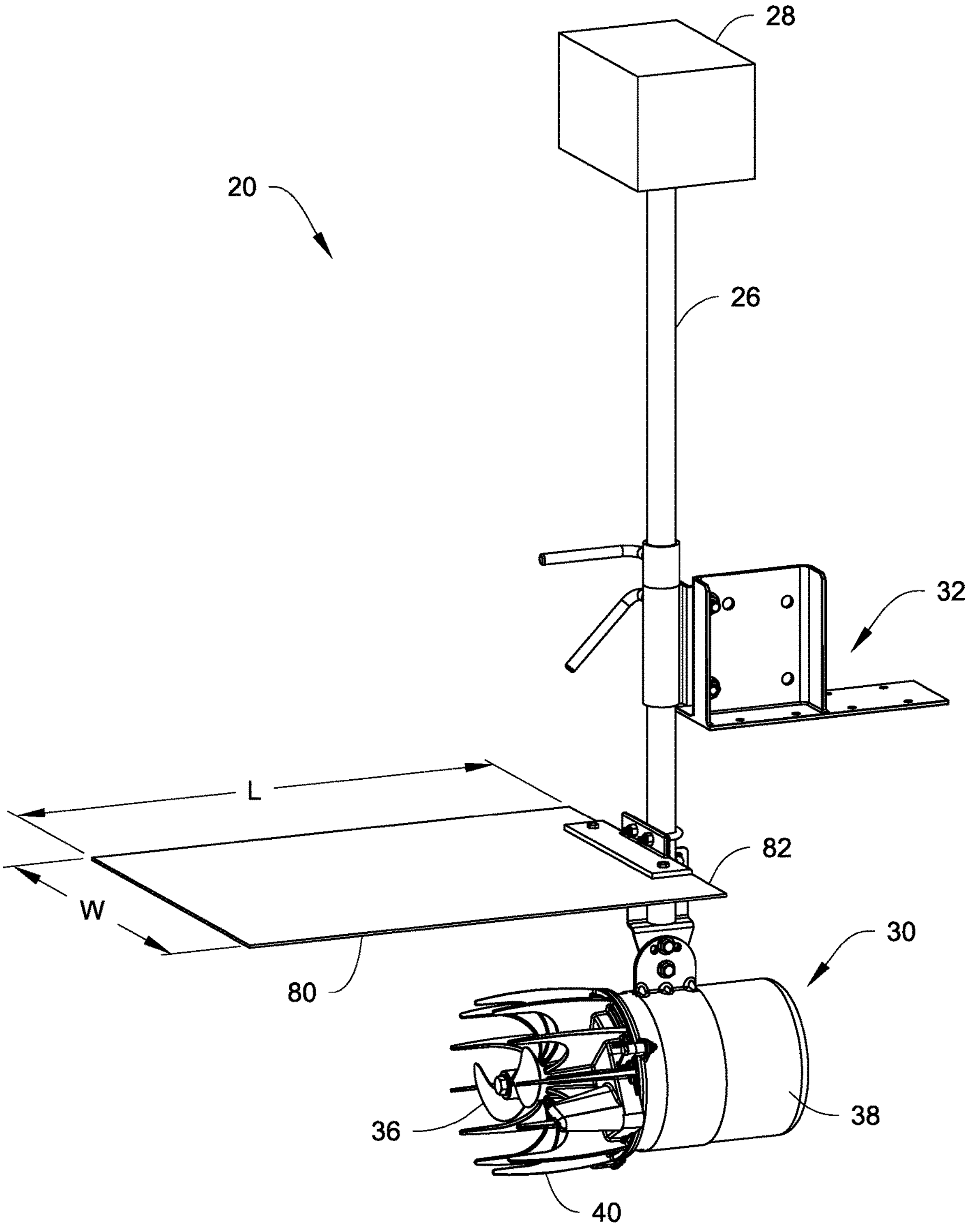
FIG. 5 depicts another example of a liquid circulator with a vortex disruptor attached to the liquid circulator.

FIG. 5 depicts another example of the liquid circulator 20. In FIG. 5, elements that are similar to or the same as elements in FIG. 2 are referenced using the same reference numerals. In FIG. 5, the liquid circulator 20 includes a vortex disruptor 80 in the form of a plate (also referred to as a vortex disruptor plate) that is fixed in position to the liquid circulator 20 at a location above the propeller 36 to disrupt a vortex created by the propeller 36. The plate can be substantially planar with an end 82 fixed to the shaft 26, and the plate may be substantially rigid. The plate has a length L that is greater than the axial length of the propeller 36 and a width W that is greater than the width of the propeller 36. In operation, the plate is disposed in the water below the surface of the water. The plate can be formed of any material that allows the plate to operate within a water environment. For example, the plate can be formed of plastic or aluminum.

Figure 6:
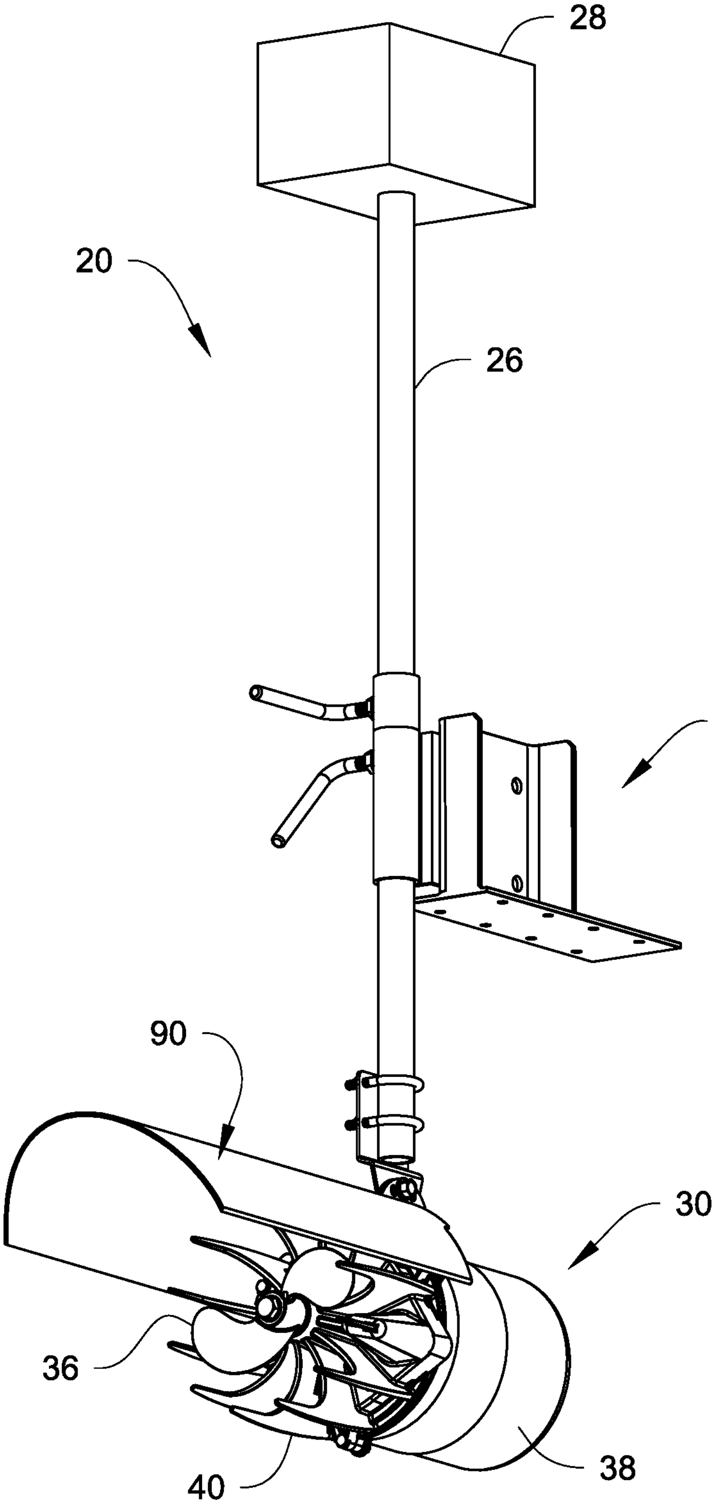
FIG. 6 depicts still another example of a liquid circulator with a vortex disruptor attached to the liquid circulator.

FIG. 6 depicts another example of the liquid circulator 20. In FIG. 6, elements that are similar to or the same as elements in FIG. 2 are referenced using the same reference numerals. In FIG. 6, the liquid circulator 20 includes a vortex disruptor 90 in the form of a curved plate (also referred to as a vortex disruptor plate) that is fixed in position to the liquid circulator 20 at a location above the propeller 36 to disrupt a vortex created by the propeller 36. The plate is curved with an end fixed to the shaft 26 or fixed to the drive motor 38, and the plate may be substantially rigid. The plate has a length that is greater than the axial length of the propeller 36, and the plate extends over an arc of from about 165 to about 180 degrees, or extends over an arc of substantially 180 degrees. In operation, the plate is disposed in the water below the surface of the water. The plate can be formed of any material that allows the plate to operate within a water environment. For example, the plate can be formed of plastic or aluminum.

Although the liquid circulator 20 is described and illustrated herein as being mounted at the end of the shaft 26, the vortex disruptors described herein can be used with other types of liquid circulators non-pole/shaft mounted liquid circulators. For example, the liquid circulator could be mounted directly to a dock, a pier or other support structure without use of the shaft 26, with the vortex disruptor suitably positioned above the liquid circulator to disrupt the vortex. In addition, the head unit 28 is optional and may not be present; for example, if the shaft 26 is used but the shaft does not oscillate but the shaft is instead manually oscillated or rotated; the head unit may or may not be utilized.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A liquid circulator system for creating liquid circulation in a body of liquid, comprising:

a liquid circulator that includes a support shaft and a liquid circulation assembly;

the support shaft is mountable to a support structure, the support shaft having an upper end that in use is disposed out of the liquid and a lower end that in use is disposed in the liquid;

the liquid circulation assembly is mounted at the lower end of the support shaft and is submerged in the liquid, the liquid circulation assembly includes a rotatable liquid propeller, an electric drive motor connected to the rotatable liquid propeller to rotate the rotatable liquid propeller, and a propeller guard at least partially surrounding the rotatable liquid propeller;

a self-locating vortex disruptor buoy that is physically separate and spaced from the support shaft, the self-locating vortex disruptor buoy is positioned at a location above the rotatable liquid propeller and is configured to self-locate relative to the rotatable liquid propeller to a position to disrupt a vortex created by the rotatable liquid propeller; and a tether attached to the self-locating vortex disruptor buoy and to the liquid circulator that prevents the self-locating vortex disruptor buoy from floating away.

2. The liquid circulator system of claim 1, wherein the self-locating vortex disruptor buoy comprises a disk portion with an upper side, a lower side and a center axis; and a conical frustum extending from the lower side coaxial with the center axis.

3. The liquid circulator system of claim 2, wherein the disk portion has a first diameter, and the conical frustum has a second, maximum diameter; and first diameter is greater than the second, maximum diameter.

4. The liquid circulator system of claim 1, wherein the self-locating vortex disruptor buoy comprises a central portion with an upper side, a lower side and a center axis; and a tapered element extending from the lower side coaxial with the center axis.

5. The liquid circulator system of claim 1, wherein the self-locating vortex disruptor buoy includes a buoy body and a connector mounted on the buoy body that is attached to an end of the tether; and the connector and the buoy body are rotatable relative to each other.

6. The liquid circulator system of claim 1, further comprising a head unit connected to the upper end of the support shaft and configured to reside above the liquid during use of the liquid circulator, the head unit controlling operation of the liquid circulation assembly.

7. The liquid circulator system of claim 1, further comprising a mount bracket that is connected to the support shaft and that is configured to mount to the support structure.

* * * * *